United States Patent [19]

Rabii

[11] Patent Number: 5,159,438
[45] Date of Patent: Oct. 27, 1992

[54] ASPECT RATIO CONVERSION OF TELEVISION DISPLAY

[75] Inventor: Khosro M. Rabii, Arlington Heights, Ill.

[73] Assignee: Zenith Electronics Corporation, Glenview, Ill.

[21] Appl. No.: 457,022

[22] Filed: Dec. 26, 1989

[51] Int. Cl.$^5$ .............................................. H04N 5/46
[52] U.S. Cl. ...................... 358/12; 358/137; 358/140; 358/180
[58] Field of Search ................... 358/12, 22, 140, 137, 358/180, 133, 138

[56] References Cited

U.S. PATENT DOCUMENTS

| | | |
|---|---|---|
| 4,651,208 | 3/1987 | Rhodes ................................. 358/140 |
| 4,654,696 | 3/1987 | Dayton ................................ 358/11 |
| 4,672,443 | 6/1987 | Dischert ............................. 358/140 |
| 4,897,722 | 1/1990 | Flory .................................. 358/180 |
| 4,984,081 | 1/1991 | Miyoshi .............................. 358/140 |

Primary Examiner—Tommy P. Chin

[57] ABSTRACT

A television receiver for displaying a 4×3 aspect ratio color video signal on a 16×9 aspect ratio surface where the digitized luma and chroma signals have a 4:2:2 or a 4:1:1 relationship of Y, R-Y and B-Y samples. A signal having an equal number of luma and chroma samples is developed by generating additional chroma samples by averaging chroma sample values over a group of two (or four for a 4:1:1 signal) successive real values. The luma and chroma samples are compressed by twenty-five percent to form a converted color signal for display. In one version this is accomplished by discarding pixels when writing into a line memory. In another version this is accomplished by reading the pixels out of a line memory at 4/3 the write clock frequency.

19 Claims, 11 Drawing Sheets

FIG. 7A  A FRAME

FIG. 7B  B FRAME

FIG. 7C  C FRAME

FIG. 7D  D FRAME

ODD / EVEN / ODD / EVEN / ODD

ASPECT RATIO CONVERSION OF TELEVISION DISPLAY

BACKGROUND OF THE INVENTION AND PRIOR ART

This invention relates generally to television display systems and particularly to a novel system for displaying a television picture having a 4×3 aspect ratio on a display screen having a 16×9 aspect ratio.

Most television cathode ray tubes (CRTs) are configured to display video signals formatted with an aspect ratio (AR) of 4×3. The AR is determined by the ratio of the horizontal dimension or length of the display to its vertical dimension, or height. For many years motion pictures have had exaggerated horizontal dimensions, and resultant displays that departed from 4×3. There are also some television systems that have CRTs suitable for displaying video signals with different ARs from the conventional 4×3 AR. A commonly discussed television video display AR is 16×9 with other ARs also being considered. Displaying a 16×9 AR video signal on a conventional 4×3 AR television CRT is readily accomplished by simply not scanning some of the upper or lower portions (or both) of the CRT. Similarly, a TV receiver having a CRT of 16×9 AR, may display a 4×3 AR video signal by not scanning portions of the left or right (or both) sides of the CRT. Some manufacturers include 4×3 scanning circuitry and add side panel curtains to block off the unscanned portions of the 16×9 AR CRT when receiving a 4×3 AR video signal.

In the system of the invention the full viewing surface of a 16×9 AR CRT is scanned when displaying a 4×3 AR video signal. Distortion of the displayed image is avoided, by compensating techniques since the image will be developed by horizontally scanning the CRT over a proportionately larger distance. These compensating techniques generally compress the signal to form a converted video signal so that it may be scanned on a portion of a larger AR display without substantial geometric distortion. In one version of the invention a decimation technique is used to compress the image signal and in another a clock speed up technique is used.

OBJECTS OF THE INVENTION

A principal object of the invention is to provide a novel video display system.

Another object of the invention is to provide a system for displaying a 4×3 AR video signal on a full 16×9 AR display surface.

A further object of the invention is to provide a means for processing a video signal formatted in a given AR for display on a display device having a greater AR.

A feature of the invention resides in a circuit for decimating a digitized video signal to enable display on a display surface having a greater AR.

Another feature of the invention resides in accelerating or speeding up the display of pixels in a digitized video signal by increasing the sampling clock frequency to permit display on a surface having a greater AR.

BRIEF DESCRIPTION OF THE DRAWINGS

These and other objects and advantages of the invention will be apparent upon reading the following description in conjunction with the drawings in which:

FIGS. 5A1, 5A2 and 5B combined are a block diagram of a portion of an AR conversion system illustrating implementation of one form of the invention;

DESCRIPTION OF THE PREFERRED EMBODIMENTS

Figure 1A:
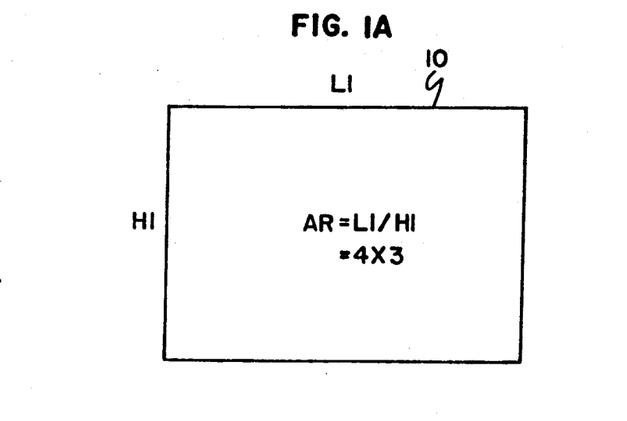
FIGS. 1A and 1B illustrate two display areas of different aspect ratios and the equations for developing the proper pixel decimation or sample clock frequency speed up factors.
Figure 1B:
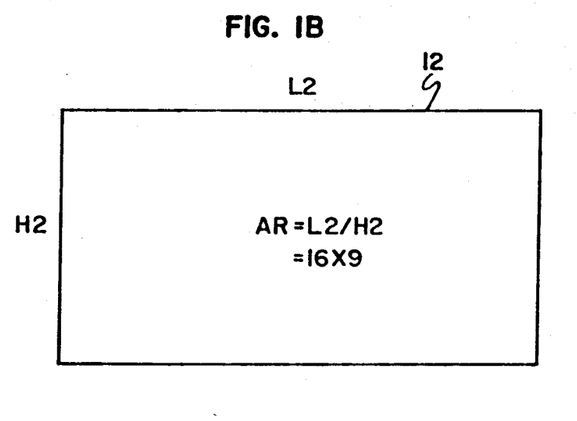

In FIG. 1 a 4×3 AR display having a height H1 and a length L1 is shown adjacent to a 16×9 AR display 12 having a height H2 and a length L2. Aspect ratio equals length divided by height or L/H. As is well known, the normal expression of aspect ratio is length by (or times) height. In FIG. 1, both methods of referring to aspect ratio are illustrated. For height normalization, H is made equal to H1 times H2. This means that the H (height) dimension is not "corrected", i.e. there is a 1:1 correlation between the different displays as far as height is concerned. The formula for deriving a corrected L1 for displaying a 4×3 AR video signal on a 16×9 AR display surface without distortion (and no height correction) indicates that L1 corrected equals ¾ L1. This is referred to as the decimation factor.

For Height $(H)$ Normalization $H = H1^{H2}$ $L1$ (corrected) $= \frac{P1}{P2} (L1)$ where $\frac{P1}{P2} < 1$ $P1 = L1H2$
$P2 = L2H1$
For $L1 = 4, H1 = 3, L2 = 16, H2 = 9$
$H = H1H2 = 3 \times 9 = 27$
$P1 = L1H2 = 4 \times 9 = 36$
$P2 = L2H1 = 16 \times 3 = 48$ $\frac{P1}{P2} = \frac{36}{48} = \frac{3}{4}$ $L1$ (corrected) $= \frac{3}{4} L1 =$ DECIMATION FACTOR While not illustrated, the same result is obtainable by reading pixels into a memory with a write clock and increasing the pixel read out clock speed by the inverse of the decimation factor, i.e. 4/3. Thus a 4×3 AR video signal may be displayed in substantially geometrically undistorted form by reading the pixels from a memory at 4/3 of the frequency used to write the pixels to the memory. With a 4×3 AR video signal being displayed on a 16×9 surface and a horizontal line of 910 pixels and sampling frequency of 4×3.58 MHz, one out of every four pixels is either dropped (decimation) or every group of four pixels is displayed in a three pixel clock duration (clock speed up).

Figure 2A:
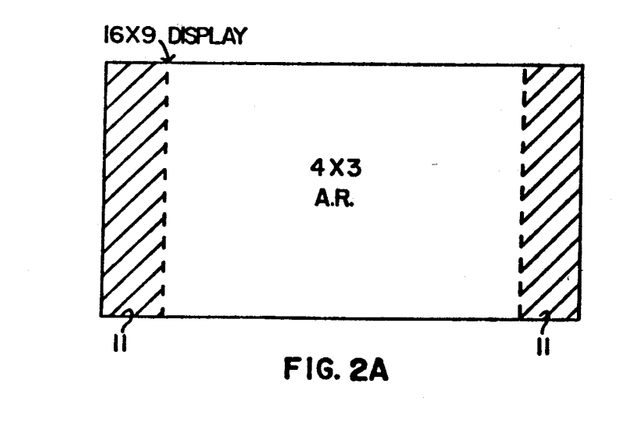
FIGS. 2A and 2B represent two approaches for displaying a 4×3 AR video signal on a 16×9 AR display surface with a normalized height.
Figure 2B:
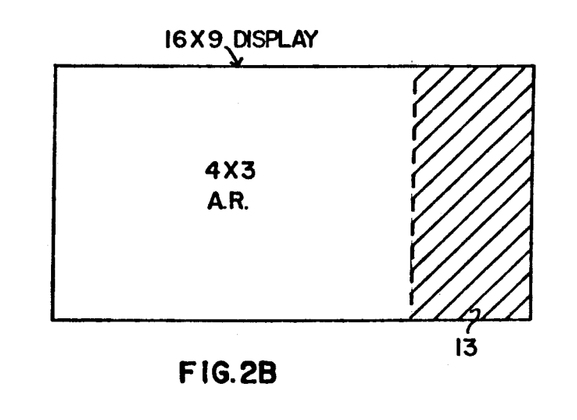

As shown in FIGS. 2A and 2B, the "converted" 4×3 AR video signal may be displayed on a 16×9 AR display surface in a number of ways, with the two shown being preferred. In FIG. 2A a section 11 on either side of the 4×3 display is shaded to indicate scanned sections of the display surface that do not include any of the 4×3 video signal. In FIG. 2B a scanned section 13 of the 16×9 surface outside of the 4×3 video signal display area, is situated to the right. Obviously section 13 could also be positioned to the left of the 4×3 video signal display. The significance of the scanned sections 11 and 13 is that the entire surface of the 16×9 AR CRT is used (i.e. actively scanned) even though a 4×3 AR video signal is being displayed. The scanned sections 11 and 13 that are not displaying any of the 4×3 AR video signal may be used to display ancillary information. In particular, these sections may be used for picture-in-picture presentations, menus for control functions and the like. The benefit to the customer is that the entire premium priced 16×9 AR television receiver display screen is being fully utilized even though a 4×3 AR video signal is being displayed. Obviously, when receiving a 16×9 formatted video signal, sections 11 or 13 would not be available.

As briefly mentioned above, displaying a 4×3 AR video signal on a 16×9 AR surface without aspect ratio conversion will yield a geometrically distorted, i.e. horizontally stretched image. To display such a signal without geometrical distortion, pixels must either be discarded or displayed at higher speed. In accordance with the invention this is accomplished by decimation, i.e. not writing certain pixels into a memory or by clock speed up, i.e. increasing the speed of reading the pixels out of memory.

Figure 3:
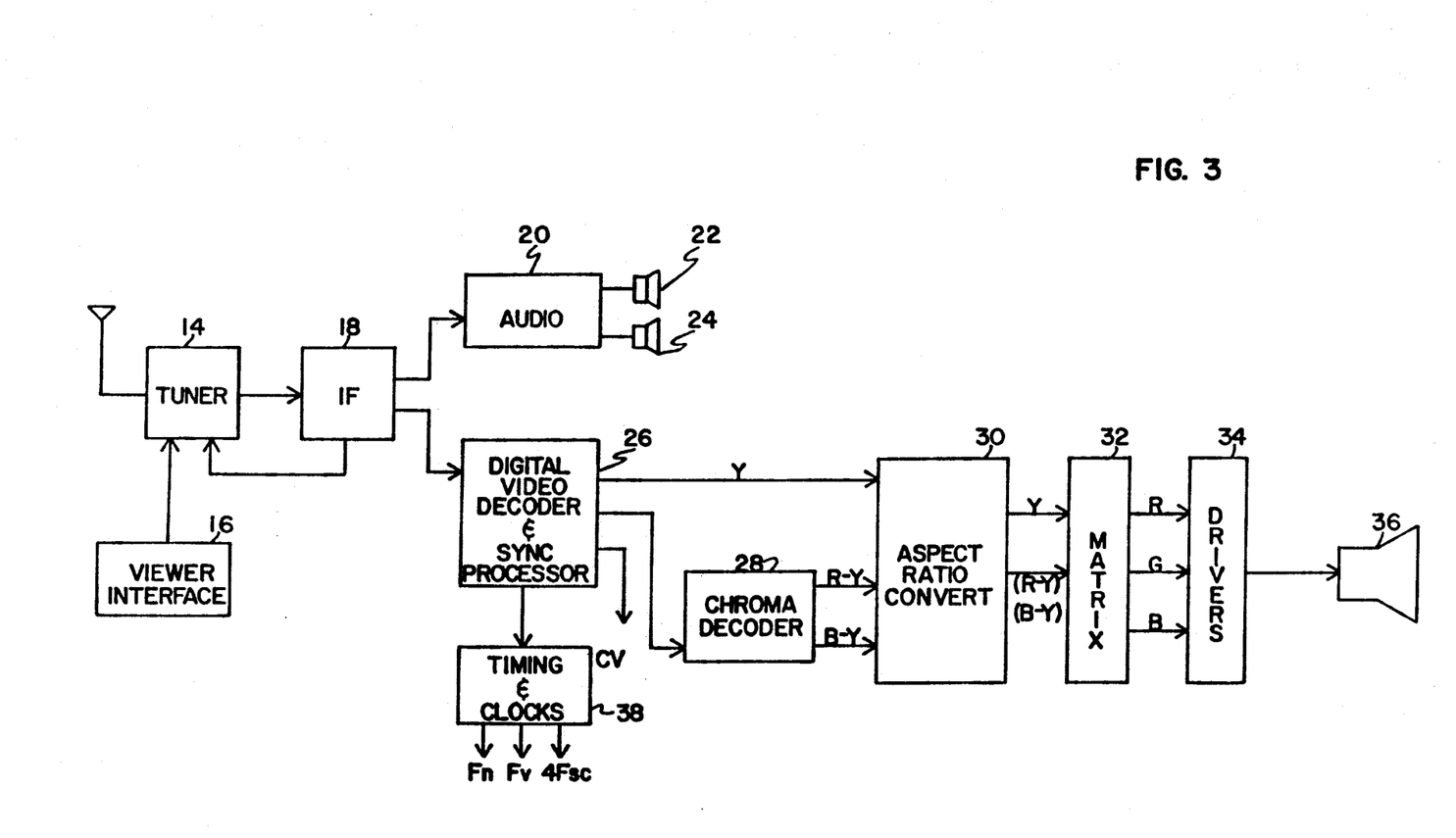
FIG. 3 is a block diagram of a television receiver constructed in accordance with the invention.

FIG. 3 shows a block diagram of a television receiver having a tuner 14 coupled to a viewer interface 16 and supplying an IF circuit 18. The viewer interface 16 may be a keyboard or a remote control device or the like for enabling a viewer to control various functions, such as channel selection, of the TV receiver. The output of IF circuit 18 is supplied to an audio processor circuit 20 which, in turn, drives a pair of loudspeakers 22 and 24 for reproducing the audio accompaniment of the received television signal. IF 18 also supplies a digital video decoder and sync processor 26 which in turn develops a digitized Y (Luma) signal and a digitized C (chroma) signal. The Y signal is applied to an aspect ratio corrector 30 and the C signal is supplied to a chroma decoder 28. The output of chroma decoder 28 comprises R-Y and B-Y color difference signals which are applied to aspect ratio converter circuit 30. The output of the converter circuit 30 is a Y signal and an (R-Y)/(B-Y) signal which is supplied to a matrix circuit 32 where the chroma and color difference signals are combined to produce R (red), G (green) and B (blue) outputs which supply drivers 34 that are coupled to a CRT 36. The symbolism (R-Y)/(B-Y) connotes that the the R-Y and B-Y signals are sequentially available. As those skilled in the art recognize the R-Y and B-Y chroma signals may be supplied in differing sample proportions relative to the Y signal samples. The video decoder 26 also supplies a timing and clock circuit 38 which develops the horizontal scanning frequency Fh, the vertical scanning frequency Fv, and the pixel sampling frequency 4Fsc which is four times the 3.58 MHz color subcarrier frequency.

Normally when the chroma signal is digitally processed (digitized) by digital processor means (not shown) in decoder 26, there are more luma samples than chroma samples, because the chroma bandwidth (500 KHz) is significantly smaller than the luma bandwidth (4.2 MHz). It is common to develop a 4:2:2, or a 4:1:1 signal which respectively relates to four luma samples for every two R-Y and B-Y samples or four luma samples for every B-Y and R-Y sample. In accordance with the invention the digitized video signal, whether 4:2:2 or 4:1:1, is converted to 4:4:4, that is, there is one luma sample for each R-Y and B-Y sample. This maintains system timing since the luma and (R-Y) (B-Y) pixels are discarded or speeded up as a group. As will be seen, it is also desirable to be certain that the real chroma samples that are developed, which are especially limited in number in a 4:1:1 system, are not simply discarded in processing of the signal without their value being taken into consideration. This is precluded by sample or pixel value interpolation. When the 4:2:2 or a 4:1:1 signal is converted to 4:4:4, interpolated sample values for the "missing" R-Y and B-Y chroma samples are used. A simple technique is to latch the last chroma sample value and use it for the succeeding luma samples that are unaccompanied by chroma samples, until another real chroma sample value is received. This however is not a preferred implementation.

Figure 4A:
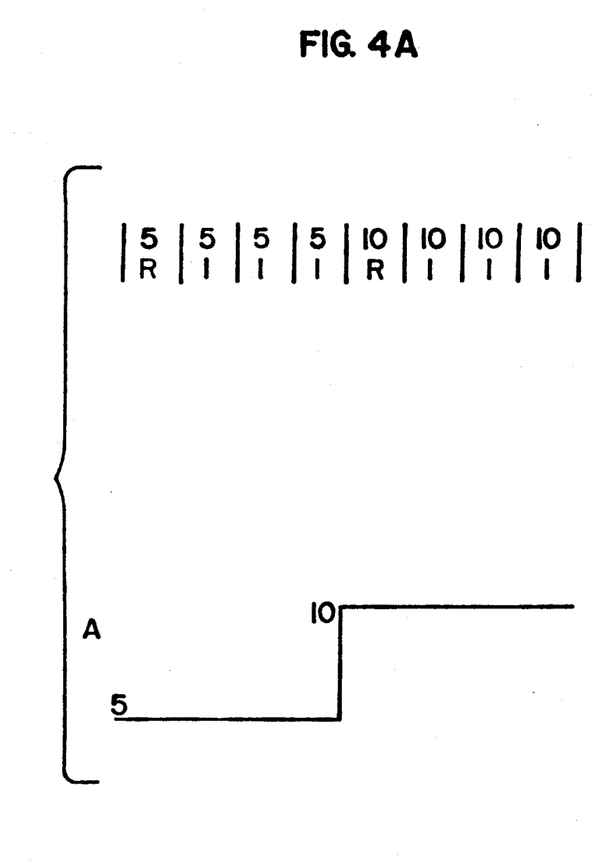
FIGS. 4A and 4B illustrate chroma sample interpolation used in the invention.
Figure 4B:
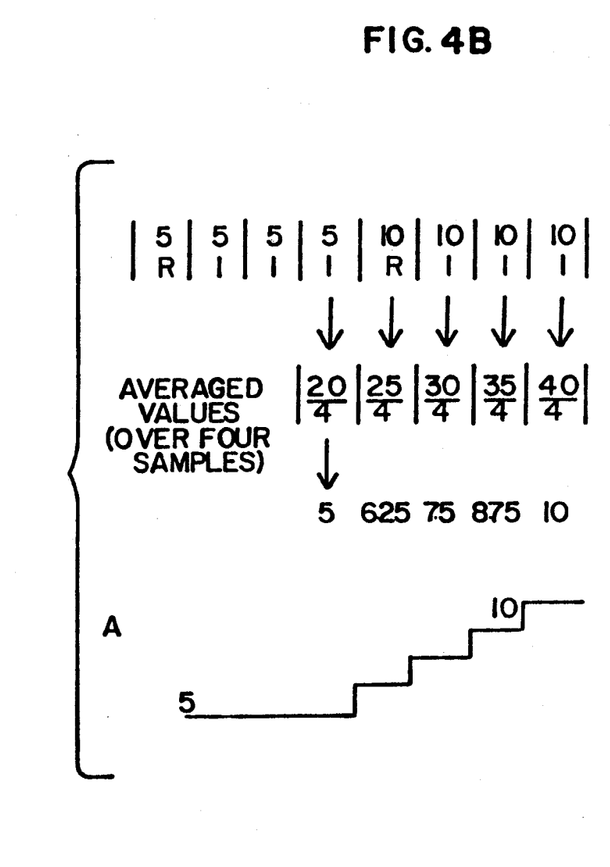

It is also desirable to avoid abrupt changes in chroma sample amplitudes during the decimation process. Since the video is random (as compared with the pixel patterns developed in the decimation process), changes in chroma sample value may be encountered that are more abrupt than in the original signal. This is illustrated in FIG. 4A where a 4:1:1 signal has been assumed with two real chroma samples of 5 and 10 and three interpolated chroma samples of 5 and three of 10. The real chroma samples are indicated by an R and the interpolated ones by an I. A displayed signal will show an abrupt change as indicated by waveform A. However, averaging the sample values with the preceding three sample values avoids such abrupt changes. This is illustrated in FIG. 4B where each sample value is determined by averaging it with the three preceding values to develop the values to be used. The stair-stepped waveform A shows the improvement, i.e. reduction in abrupt change. This is especially important where the signal is to be decimated and pixels have to be discarded. The number of samples used in averaging is determined by the system, i.e. 4:2:2 or 4:1:1, with four samples used in the latter and two in the former.

Figure 5A:
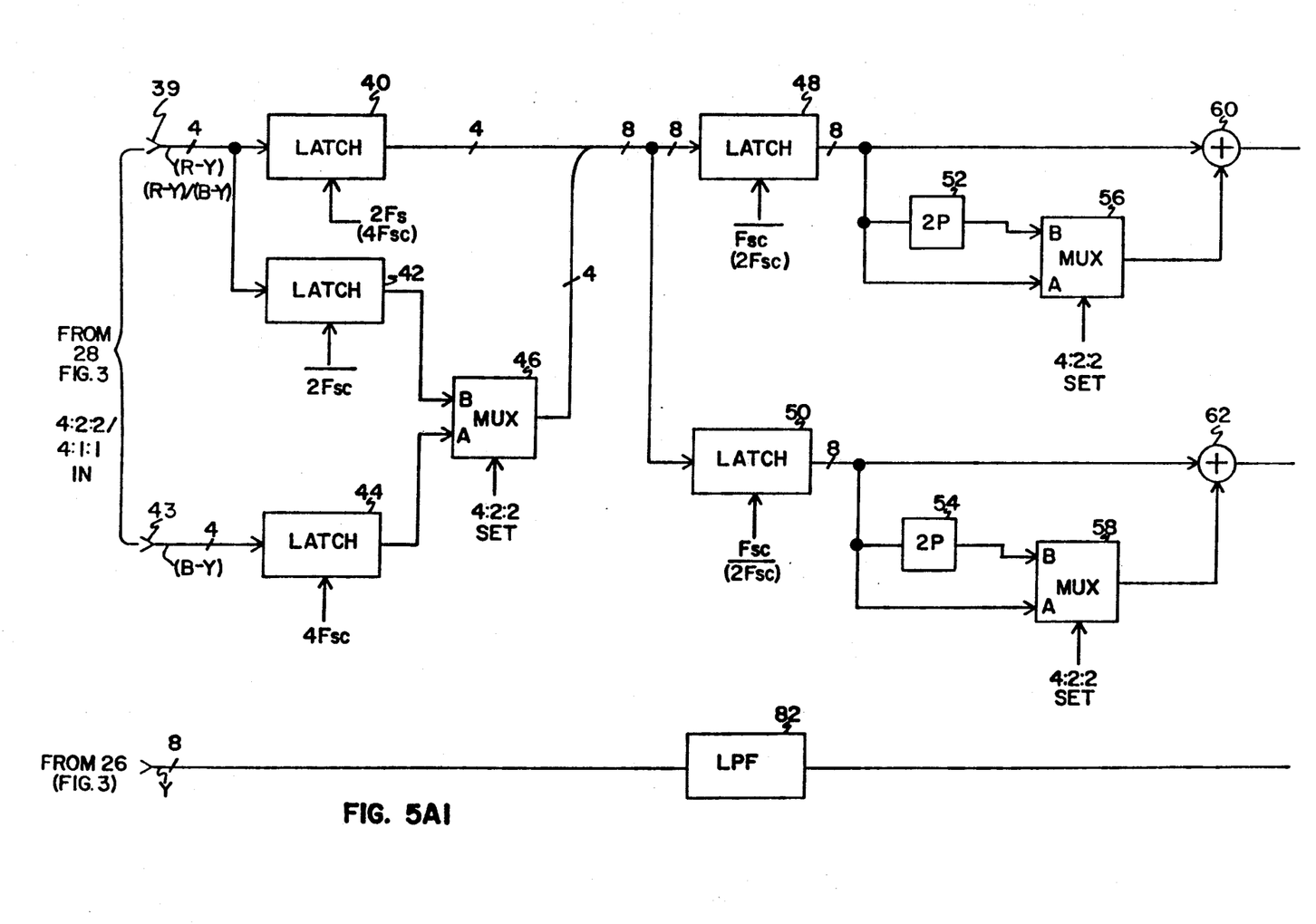
Figure 5A:
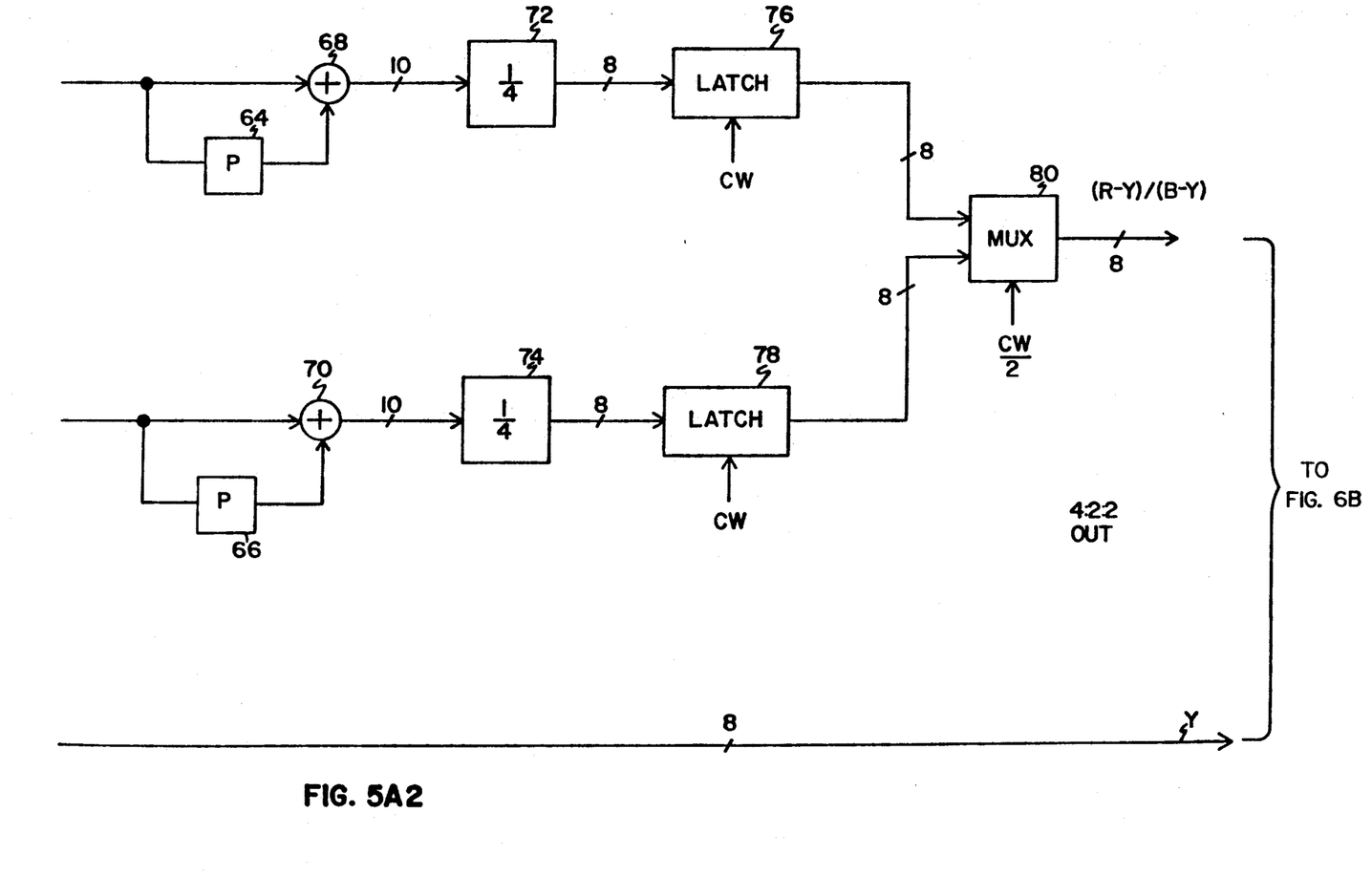
Figure 5B:
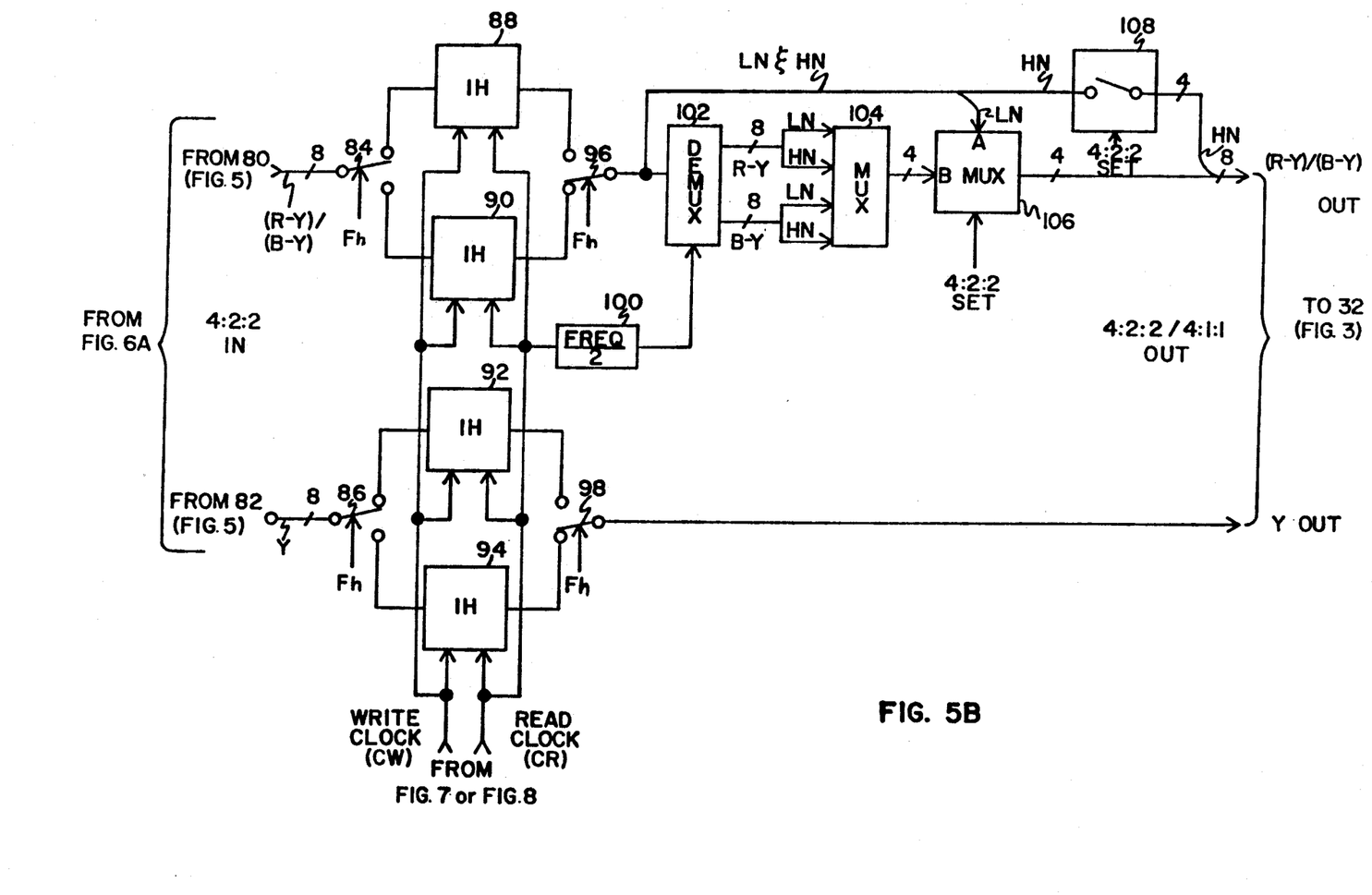

In FIGS. 5A and 5B, a block diagram of a preferred circuit accomplishing this type of interpolation and video signal processing is shown. The numbers opposite the various lines indicate the number of bits in the digital signals carried thereon. Thus the input signal at terminal 39 and the input signal at terminal 43 each consist of 4 bits. The figure accommodates both a 4:2:2 signal input and a 4:1:1 signal input. For 4:2:2, the signal at terminal 39 is 4 bits of low nibble R-Y and the signal at terminal 43 is 4 bits of high nibble R-Y. For a 4:1:1 input, the signal at terminal 39 is 4 bits of low nibble (LN) R-Y followed by 4 bits of high nibble (HN) R-Y, followed by 4 bits of LN B-Y and 4 bits of HN B-Y. Input terminal 43 is not active in the 4:1:1 mode. Selection of the 4:2:2 and 4:1:1 modes is done by a 4:2:2 set signal.

The input signal at terminal 39 is supplied to a pair of latches 40 and 42 with latch 40 being controlled by a 2Fsc timing signal or by a 4Fsc timing signal. Latch 42 is controlled by an inverse 2Fsc timing signal. The input signal at terminal 43 is applied to a latch 44 which is controlled by a 4Fsc timing signal. The output of latch 40 is a 4 bit signal which is applied to another latch 48 along with the output of a multiplexer 46 which is supplied with inputs from latches 42 and 44. Multiplexer 46 is enabled by the 4:2:2 set signal. When the set signal is present (4:2:2 operation), the terminal marked A of the multiplexer 46 is coupled to the output of the multiplexer 46. When the set signal is absent (4:1:1 operation) multiplexer 46 couples terminal B to its output. In 4:2:2 operation a sample of luma is accompanied by a sample of R-Y and the following luma sample is accompanied by a sample of B-Y. The timing signals indicated in parenthesis are present during 4:2:2 operation. For 4:1:1 operation, the other timing signals shown (not in parenthesis) are present. For 4:2:2 operation, two luma samples are needed for one complete R-Y and B-Y sample. In 4:1:1 operation, the first sample of luma is accompanied by a 4 bit LN R-Y sample, the second sample of luma is accompanied by a 4 bit HN sample of R-Y, the third luma sample is accompanied by a four bit LN sample of B-Y and the fourth luma sample is accompanied by a HN 4 bit sample of B-Y. Thus four luma samples are needed for a complete R-Y and B-Y chroma sample. The 4:2:2 set signal sets multiplexer 46 to only look at its B input when in the 4:2:2 operating mode. The arrangement illustrates how both 4:2:2 and 4:1:1 signals are processed to produce 8 bit chroma signals at the input of latch 48 and at the input of latch 50.

To recapitulate, with a 4:2:2 set signal present, B-Y samples are applied by latch 44 and multiplexer 46 to the inputs of latches 48 and 50 along with R-Y samples, which are applied through latch 40. Latch 42 is ineffective and timing signal 4Fsc operates to properly direct R-Y and B-Y, in sequence, to latches 48 and 50. For 4:1:1 operation, the R-Y and B-Y signals are sequentially present at input terminal 39, no signal appears at input 43 and the 4:2:2 set signal is not present. The output of multiplexer 46 is connected to input terminal B and input terminal A is open. Because of the 2Fsc timing signals, the low nibbles of R-Y and B-Y are applied to latch 40 and the high nibbles of R-Y and B-Y are applied to latch 42. The R-Y and B-Y signals are combined on the 8 bit line input to latches 48 and 50. The output of latch 48 consists of an 8 bit R-Y signal and the output of latch 50 consists of an 8 bit B-Y color signal. Sample interpolation is now performed as discussed in connection with FIG. 4B.

The output of latch 48 is coupled to the first input of an adder 60, through a 2P (two pixel) delay 52 to the B input of a multiplexer 56, and directly to the A input of multiplexer 56. The output of multiplexer 56 is coupled to the second input of adder 60. Similarly the output of latch 50 is coupled through a 2P delay 54 to the B input of a multiplexer 58; directly to the A input of multiplexer 58; and to the first input of an adder 62. The output of multiplexer 58 is coupled to the second input of the adder 62. Both multiplexers 56 and 58 are supplied with a 4:2:2 set signal. As described previously, when the set signal is present, the multiplexers connect their output terminals to their A input terminals and when the set signal is not present their outputs are coupled to their B input terminals. For 4:2:2 operation, the 2P delay circuits are therefore bypassed and the output of multiplexer 56 is simply applied to adder 60, which doubles the signal amplitude received from latch 48 in the output of adder 60. With the 4:2:2 set signal absent, (4:1:1 operation) the signal from latch 48 is delayed by two pixels and added to the undelayed signal in adder 60.

The output of adder 60 is coupled to the input of another adder 68 and through a 1P delay circuit 64 to the second input of an adder 68. Thus the signal output of adder 68 is the output of adder 60 plus the output of adder 60 delayed by one pixel. For 4:1:1, the result is the summation of four successive pixels, (a given pixel and the three previous pixels) in adder 68. For 4:2:2, the result is the summation of two successive pixels. The output of adder 68 is supplied to a divide-by-four circuit 72 since the amplitude has been multiplied by four by the processing in adders 60 and 68. This corrects for the increase in amplitude. At this point a change from 4:1:1 to 4:2:2 is made before performing aspect ratio conversion in order to effect a savings in hardware. The signal is applied to a latch 76 that is controlled by a write clock signal (CW). The output of latch 76 is supplied to one input of a multiplexer 80. Similarly the output of adder 62 is supplied directly, and through a one pixel delay 66, to the two inputs of an adder 70, the output of which is supplied to a divide-by-four circuit 74 which feeds a latch 78. Latch 78 is also controlled by the write signal CW and its output is applied to the input of multiplexer 80. Multiplexer 80 is controlled at one half the CW frequency and its output consists of (R-Y)/(B-Y), that is, alternating R-Y and B-Y signals. The 8 bit luma signal is supplied through a low pass filter (LPF) 82 without processing. The low pass filter 82 is used to guard against "aliasing" because of the different frequency components that are being processed.

In FIG. 5B the (R-Y)/(B-Y) signals from multiplexer 80 are applied to the input of a switch 84 which is operated at an Fh rate. The Y signal from LPF 82 is applied to a switch 86 which is also operated at an Fh rate. Two one-horizontal line (1H) memories 88 and 90, are provided for the chroma signals and a pair of 1H memories 92 and 94 is provided for the Y signal. The 1H memories are written to by the CW clock and read out by the read signal clock (CR). The memory outputs are similarly switched by means of switches 96 and 98 which are individually driven by Fh clock signals. The Y output is applied directly to the matrix circuit 32 in FIG. 3. In order to provide a choice of 4:2:2 or 4:1:1 outputs, the chroma output is applied to a demultiplexer circuit 102 which in turn is coupled to a multiplexer circuit 104. The output of multiplexer 104 is coupled to another multiplexer circuit 106 which also receives the (R-Y)/(B-Y) chroma signal input from switch 96. Switch 96 also supplies this chroma signal to another switch 108 which is operated in response to the 4:2:2 set signal. The output of switch 108 and multiplexer 106 are combined to produce a converted color signal (R-Y)/(B-Y) for application to matrix 32 in FIG. 3. The read clock signal CR is divided down to one-half frequency in frequency divider 100 and applied to operate demultiplexer 102. As indicated on FIG. 5B, the output (decimated or speeded up) signal may be changed between 4:2:2 and 4:1:1 by the 4:2:2 set signal. In the case of 4:1:1, the LN and HN R-Y and B-Y signals both come from multiplexer 106 since switch 108 is open. For 4:2:2, multiplexer 106 connects its B input terminal to its output and switch 108 couples the HN (on 4 lines) with which the LN (on 4 lines) from multiplexer 106, provides an 8 bit (R-Y)/(B-Y) output.

Figure 6A:
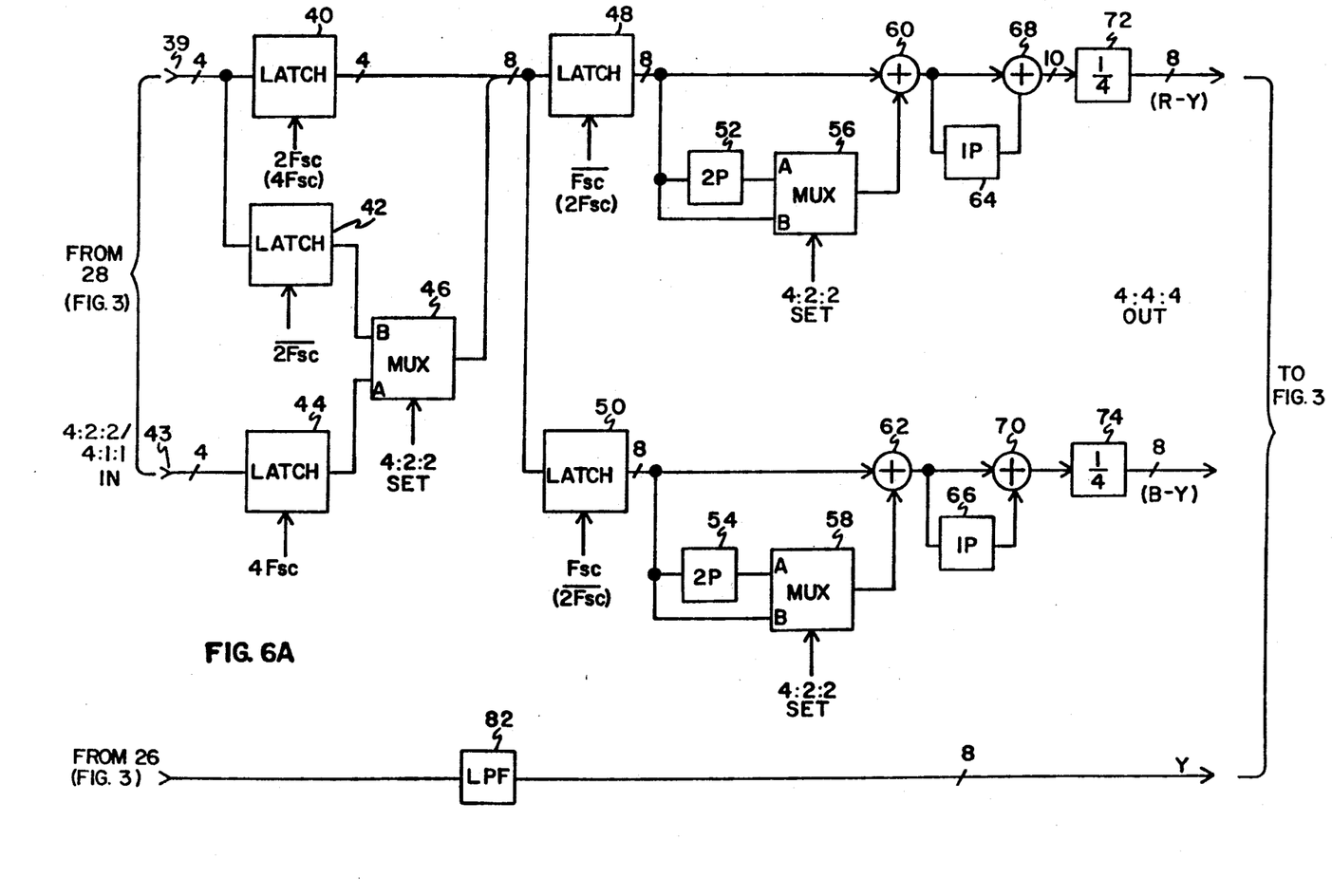
FIGS. 6A and 6B combined are a block diagram of a portion of an AR conversion system illustrating implementation of another form of the invention.
Figure 6B:
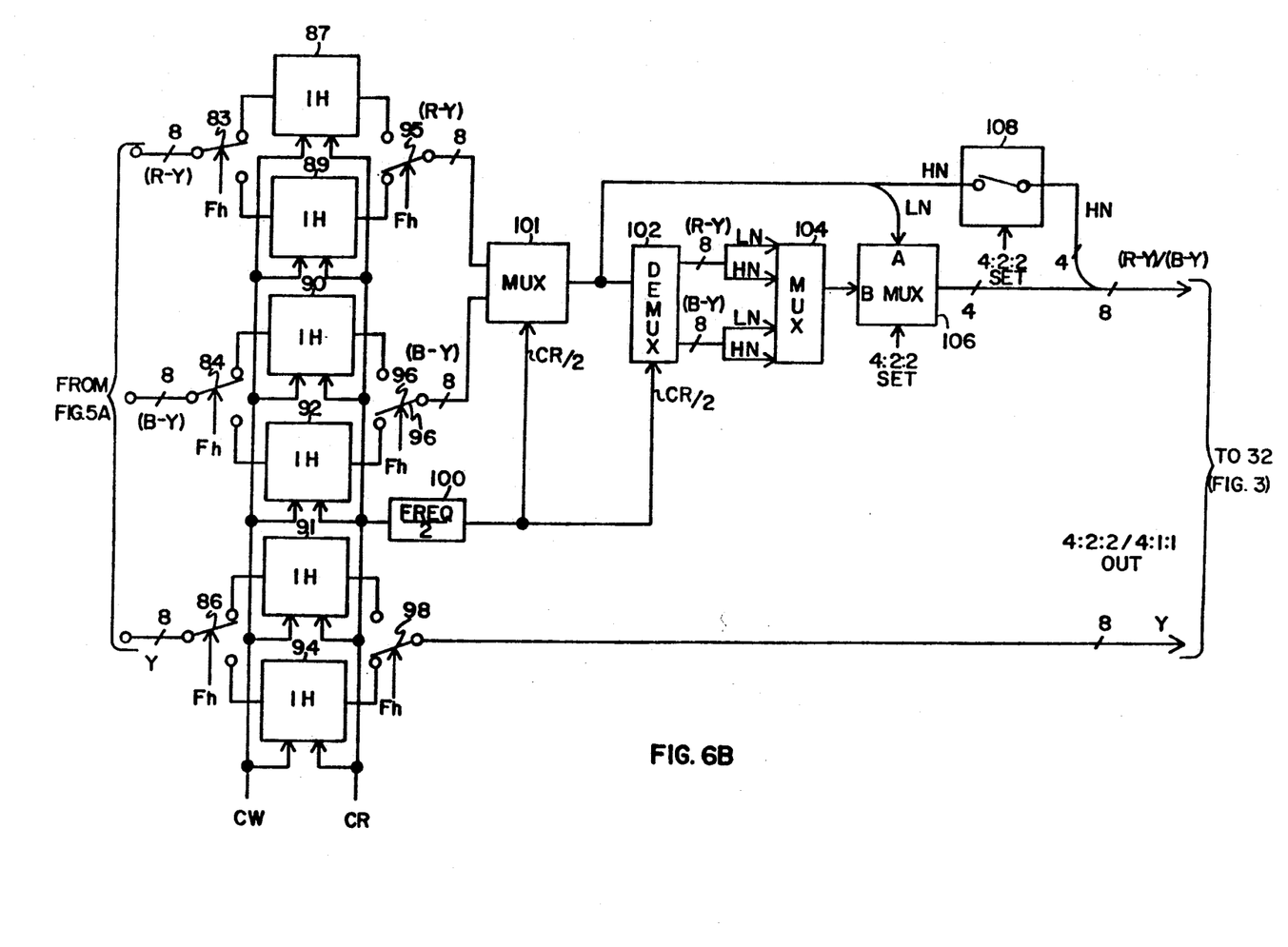
Figure 7A:
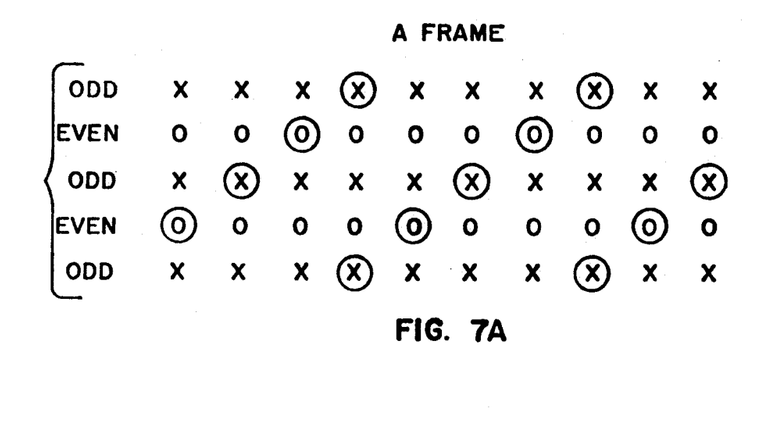
FIGS. 7A through 7D are partial depictions of the pixel decimation utilized in the invention.
Figure 7B:
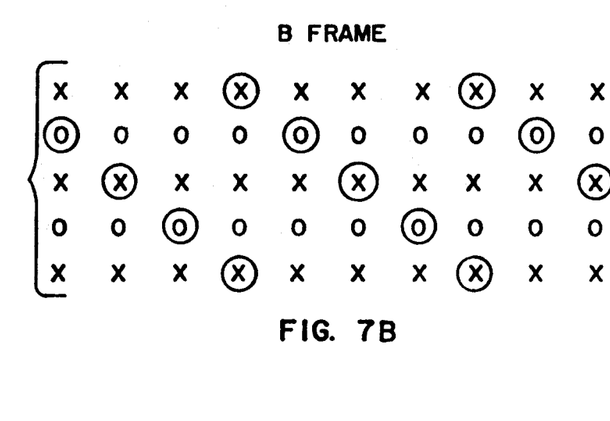
Figure 7C:
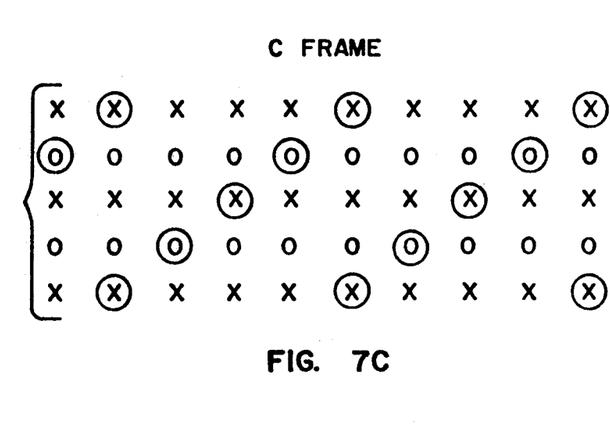
Figure 7D:
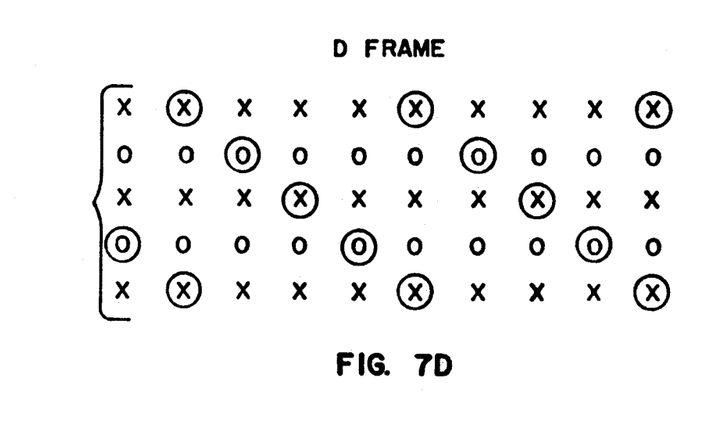

FIGS. 6A and 6B represent a full 4:4:4 signal processing system without changing to 4:2:2 before performing aspect ratio conversion. FIG. 6A is identical to FIG. 6B up to divider circuits 72 and 74, the outputs of which consist of 8 bits of R-Y and B-Y, respectively. it will be noted that this output is 4:4:4 since there is simultaneously present 8 bits of Y signal. In FIG. 6B, two additional 1H memories 87 and 89 and two additional switches 83 and 95 are used. The R-Y signal from divider 72 in FIG. 6A is applied to input switch 83 and the B-Y signal from divider 74 is applied to switch 84. (In 4:2:2 operation, switch 84 received alternating R-Y, and B-Y signals.) Thus a total of six 1H memories, rather than four, and two extra switches are needed. The latches 76 and 78 of FIG. 5A are not required and the output of switches 95 and 96 are applied to a multiplexer 101 that is operated by CR/2. Luma signal processing is unchanged. As will be seen, the aspect ratio conversion occurs in the circuitry that includes the memories. Consequently the converted color signal is now applied to the circuitry previously described in FIG. 5B for outputting it in 4:2:2 or 4:1:1 form, as required.

In the embodiment chosen for purposes of description of the invention, each horizontal line contains 910 pixels and the sampling rate is four times the color subcarrier frequency. Discarding every fourth pixel is therefore an attractive solution to the problem of displaying a 4×3 AR video signal on a (scanned) 16×9 AR display surface without geometric distortion. This is referred to as decimation. The pixels that are discarded are selected to avoid a noticeable pattern being presented to the viewer. Generally horizontal and vertical orientation of the dropped pixels should be avoided. In accordance with this aspect of the invention, pixels are discarded along different orthogonally-related diagonal lines of the display in a repeat pattern covering a series of four frames.

FIGS. 7A-7D illustrate (in a small representative section of the display area) the effect of decimation. The odd field pixels are represented by X's and the even fields by O's with dropped pixels being circled. Concentrating on frame A (FIG. 7A), it is seen that the fourth pixel in the first line of the odd field is dropped, as is the eighth pixel, etc. On the second line of the odd field the second pixel is dropped, followed by the 6th pixel, etc. On the third line of the odd field the fourth pixel is again dropped. This stems from the mathematical relationship of the 910 pixels on each horizontal line and the pixel sampling frequency of 4Fsc resulting in 227 ¼ pixels being dropped on each line (frequency interleaving). System timing continues the every-fourth-pixel dropping sequence to successive lines to produce the pattern illustrated. Operation is the same for the even fields, with every fourth pixel being dropped. The dropped pixels are along parallel, diagonal lines in each frame, with the diagonal lines being orthogonally related in successive frames. The visual effect of this processing, over cycles of four successive frames of the video display, is minimal (in terms of pattern recognition) to the viewer.

Figure 8:
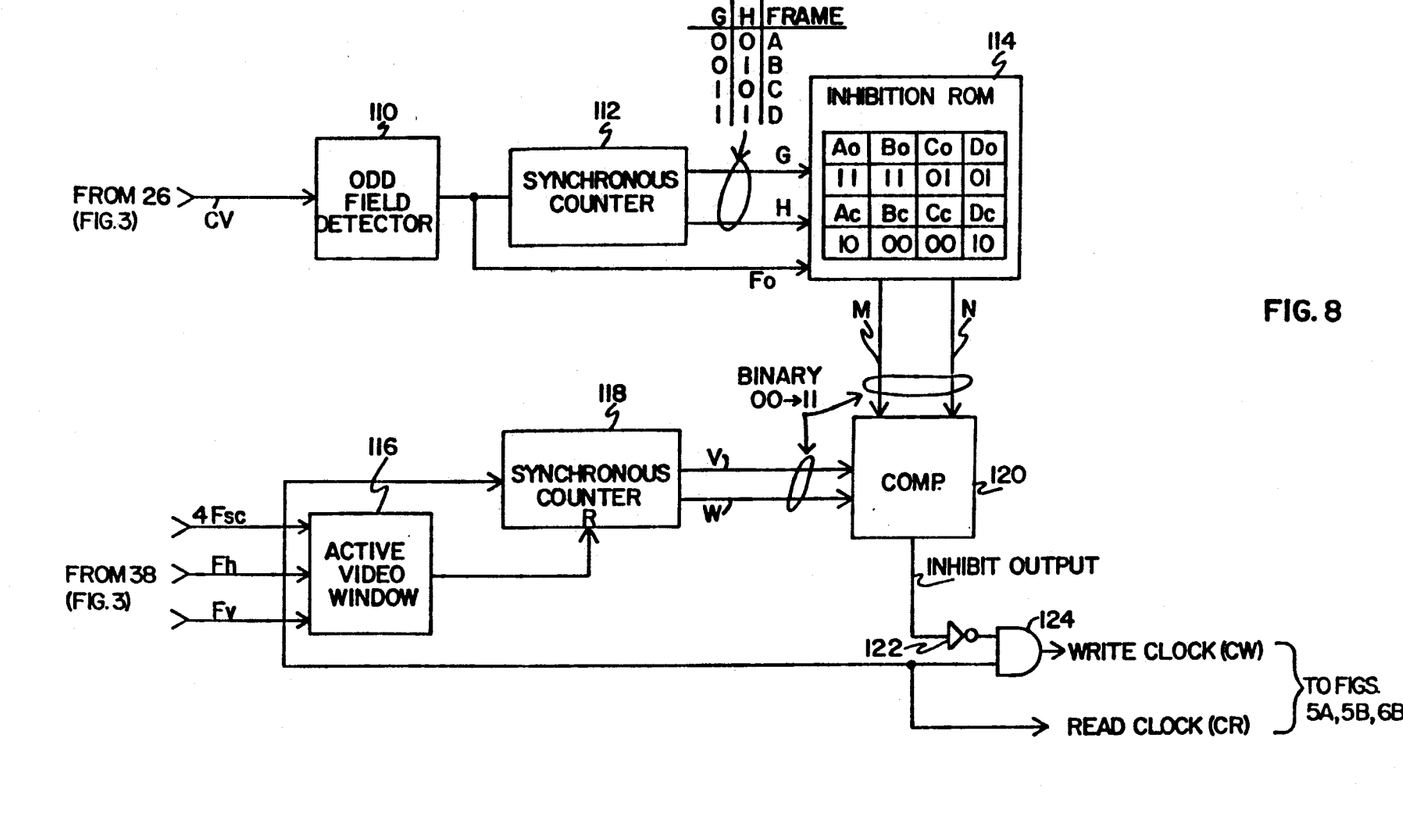
FIG. 8 is a block diagram of a portion of the AR conversion system showing pixel decimation.

FIG. 8 discloses an arrangement for use with either FIGS. 5B or 6B for decimating the video signal by discarding every fourth pixel. As discussed above, decimation occurs over a succession or cycle of four frames, each frame consisting of an odd field and an even field. The composite video signal is applied to an odd field detector 110. Detector 110 is coupled to a synchronous counter 112 which counts each frame and indicates the count thereof in the form of binary signals on a pair of output leads G and H. For simplicity, the output lead designations and the signals carried thereon are used interchangeably herein. The output of detector 110 produces a binary or boolean signal Fo when an odd field is detected. The frame count cycles every four frames, indicated as frames A, B, C and D. Signals G, H and Fo are applied to an inhibition ROM 114 which produces a pair of binary outputs on leads M and N. Timing signals 4Fsc, Fh and Fv are applied to an ac:.ve video window 116 which produces an output during active video portions of the signal, i.e. at all times except during sync intervals. The 4Fsc clock signal also drives another synchronous counter 118 which is reset by the output signal from the active video window 116. The binary output of synchronous counter 118 appears on leads V and W which, in conjunction with leads M and N, supply inputs to a comparator 120 which compares the binary counts on the two sets of binary inputs M, N and V, W. The output of comparator 120 is supplied, through an inverter 122, to one input of an AND gate 124 which has its other input supplied with the 4Fsc clock. The output of AND 124 constitutes the write clock CW for application to the write clock input terminal of FIGS. 5A, 5B and 6B for controlling operation of the 1H memories in the aspect ratio converter (and the 4:4:4 to 4:2:2 change in circuitry of FIG. 5A).

As indicated by the table adjacent to leads G and H, the four successive frames A, B, C and D are identified by the output bit configuration of the synchronous counter 112. The logic signals G and H are applied with signal Fo, which indicates an odd field, to inhibition ROM 114 which develops output signals on leads M and N in accordance with the table shown in ROM 114. The table indicates that during occurrence of the odd field in Frame A (Ao), a binary output "11" is developed on leads M, N. During the even field of frame A (Ae) a binary output of "10" is developed. Similarly during the odd field of frame B a "11" output is developed and during the even field of frame B a "00" is developed. The cycle repeats every four frames with the binary output of inhibition ROM 114 being continuously supplied as one set of inputs to comparator 120. Synchronous counter 118 is also supplying a set of cyclical binary inputs ("00" to "11") to comparator 120 on leads V, W. When there is a match detected by comparator 120 between its two sets of binary inputs, an inhibit signal is developed. The inhibit signal occurs for every fourth pixel and therefore write clock CW is inhibited for every fourth pixel. The read clock (CR) on the other hand is the same as the 4Fsc signal and is active for every pixel. The CR and CW clock signals are applied to appropriate inputs of FIGS. 5A, 5B and 6B and each line of luma and chroma is written into a 1H line memory by inhibited write clock CW. Consequently, one out of four pixels is not written into the 1H memories and is effectively lost or discarded. The memories are read out on an every-pixel-basis by the read clock CR. Thus the color video signal input to the memories is decimated by twenty-five percent to produce the converted color signal.

Figure 9:
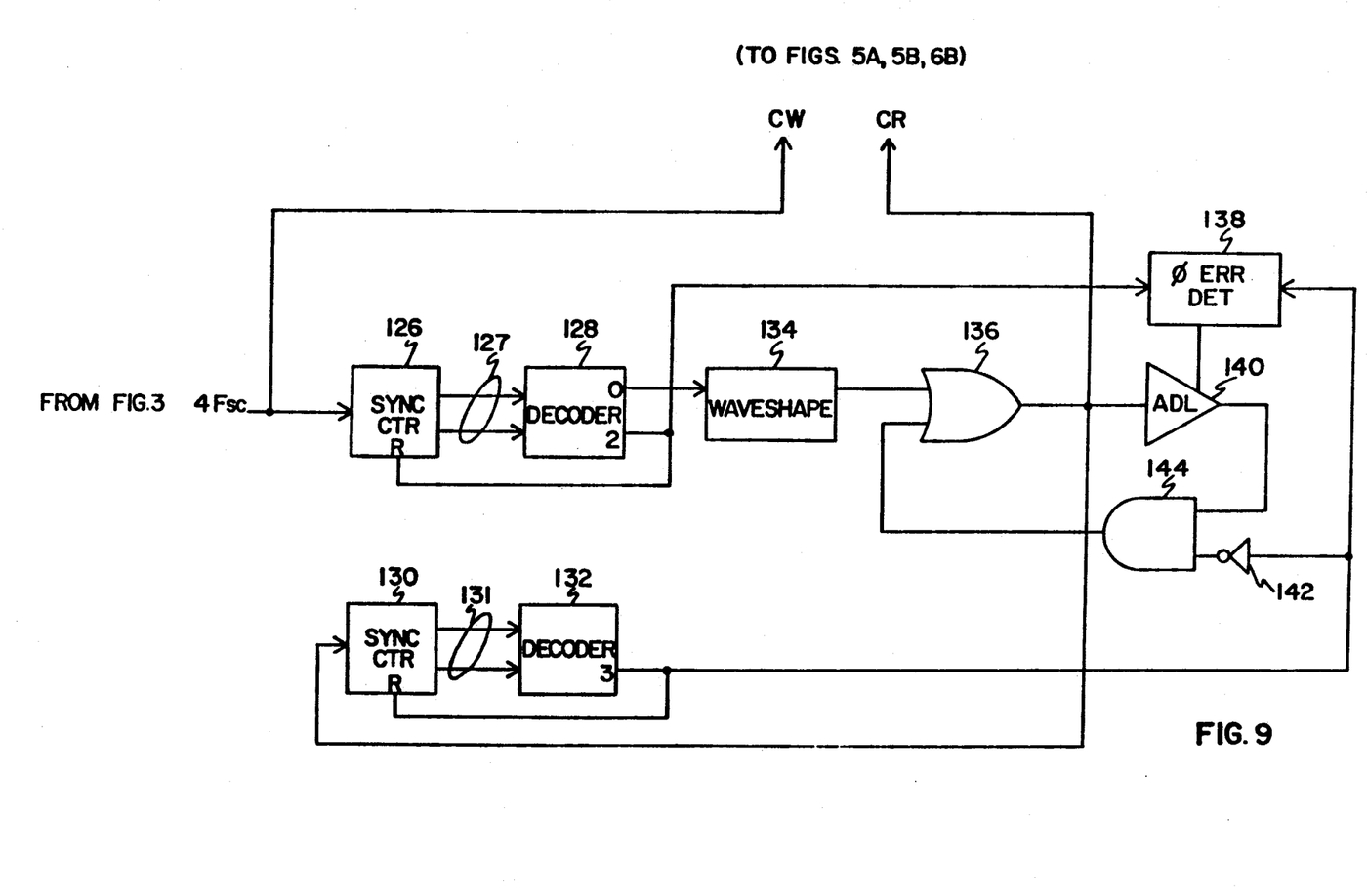
FIG. 9 is a block diagram of a portion of the AR conversion system for developing a speed up clock.

In FIG. 9 a system is shown for accomplishing the same result with timing speedup. As mentioned, the 4×3 AR video signal may be reformatted for display on a 16×9 AR surface without geometric distortion by reading the pixels out of memory at a faster rate. The system requires that four read clocks or pulses be developed for every three write clocks. This is equivalent to making the CR clock 4/3 the frequency of the CW clock. 4Fsc is supplied directly as the CW clock (to FIGS. 5A, 5B and 6B) and to a synchronous counter 126 which develops and applies a pair of binary outputs 127 to a decoder 128. Decoder 128 has a "0" output that is coupled, through a wave-shape circuit 134, to one input of an OR gate 136. A "2" output of decoder 128 is coupled to a reset terminal of synchronous counter 126 and to an input of a phase error detector 138. The output of OR 136 develops the read clock CR (for FIGS. 5A, 5B and 6B) and which is also supplied to the input of a synchronous counter 130 and to an active delay line (ADL) 140, the output of which is coupled to an AND gate 144. Counter 130 develops and applies a pair of binary outputs 131 to a decoder 132 that has a "3" output connected back to the reset terminal of the synchronous counter 130 and to another input of phase detector 138. The "3" output is also supplied through an inverter 142 to the other input of AND 144. The output of error detector 138 controls operation of ADL 140.

The numbered outputs of the decoders 128 and 132 indicate the count at which the respective output is activated. Thus, decoder 128 develops a signal at its "0" output upon receipt of the first count from synchronous counter 126, and a signal at its "2" output upon the third count. (The cycle of binary counts repeats, with the appropriate outputs being activated during each cycle.) Similarly for synchronous counter 130, output "3" is activated at every fourth count in each counting cycle of counter 130. Consequently the two signals fed to phase detector 138 consist of every third count of the write clock CW and every fourth count of the read clock CR. Thus the circuit functions as a comparator for comparing three CW counts with four CR counts and adjusts the delay of ADL 140 to control the operation of synchronous counter 130.

Reverting to FIGS. 5B and 6B, the luma and chroma signals are written into the 1H memories by the write clock CW, with all pixels being entered into the individual line memories. When each 1H memory is read out, however, it is read out under control of the read clock CR which is 4/3 of the CW clock frequency. The pixels are therefore read out at a 4/3 CW rate which results in a speeded up display. The system geometry and timing is identical to that previously described.

It should be apparent that changing the signal from 4:4:4 to 4:2:2 before doing aspect ratio conversion yields less accurate chroma than aspect ratio converting the signal in the 4:4:4 state. However the chroma interpolation that is performed in changing to the 4:4:4 state with an input of 4:2:2 or 4:1:1, minimizes any inaccuracies. Indeed if the incoming signal is 4:2:2, nothing is lost (because of the interpolation). If the input signal is 4:1:1 and the output converted signal is 4:2:2, there is a net gain in chroma. In the timing speed up implementation there is no detriment in any case.

What is claimed is:

1. A method of processing a color video signal formatted with an aspect ratio $L1 \times H1$ for a display on a surface having a larger aspect ratio $L2 \times H2$ with the H1, H2 dimensions being normalized, comprising the steps of:
   digitizing the color video signal into luma components and chroma components;
   developing an equal number of chroma samples and luma samples from said luma components and said chroma components, respectively;
   discarding a proportionate number of said luma samples and said chroma samples when writing the remaining luma and chroma samples into a memory;
   reading said remaining luma samples and chroma samples from said memory to form a converted color signal by a factor L1H2/L2H1; and
   displaying said converted color signal on said large aspect ratio surface.

2. A method of processing a color video signal formatted with an aspect ratio $L1 \times H1$ for display on a surface having a larger aspect ratio $L2 \times H2$ with the H1, H2 dimensions being normalized, comprising the steps of:
   digitizing said color video signal into luma samples and chroma samples where said luma samples outnumber said chroma samples;
   interpolating said chroma samples to develop a signal having an equal number of said luma samples and said chroma samples;
   compressing said luma samples and corresponding ones of said chroma samples by a factor L1H2/L2H1 to form a converted color signal; and
   displaying said converted color signal on said larger aspect ratio surface.

3. The method of claim 2 wherein said interpolation step averages said chroma samples over a given number of said luma samples.

4. The method of claim 3 wherein said compressing step comprises:
   discarding a proportionate number of said luma samples and said chroma samples when writing the remaining luma and chroma samples into a memory; and
   reading said remaining luma samples and said remaining chroma samples from said memory.

5. The method of claim 3 wherein said compressing step comprises:
   writing said luma samples and said corresponding ones of said chroma samples into respective memories with a write clock; and
   reading said luma samples and said corresponding ones of said chroma samples from said respective memories with a read clock that is faster than said write clock by one over said factor.

6. A method of processing a color video signal formatted with a $4 \times 3$ aspect ratio for displaying on a surface having a $16 \times 9$ aspect ratio comprising the steps of:
   digitizing the color video signal into luma samples and chroma samples;
   forming a converted color signal by developing an equal number of said chroma samples and said luma samples, discarding one out of four of said luma samples and corresponding ones of said chroma samples when writing the remaining samples into a memory and reading said remaining luma samples and corresponding ones of said chroma samples from said memory; and
   displaying said converted color signal on said $16 \times 9$ aspect ratio surface without substantial geometric distortion.

7. A method of processing a digitized color video signal having pixels represented by a greater number of luma samples than chroma samples and being formatted with a $4 \times 3$ aspect ratio for display on a surface having a $16 \times 9$ aspect ratio comprising the steps of:

developing a digitized signal having an equal number of said chroma samples and said luma samples by averaging each said chroma sample with a predetermined number of preceding ones of said chroma samples;

compressing said digitized signal by twenty-five percent to form a converted color signal; and displaying said converted color signal on a scanned display of 16×9 aspect ratio.

8. The method of claim 7 wherein said compressing step comprises:

writing said digitized signal into a horizontal line memory with an inhibited write clock that discards every fourth one of said luma samples and a corresponding one of said chroma samples; and reading from said horizontal line memory with an uninhibited read clock of the same frequency as said inhibited write clock.

9. The method of claim 8 wherein said inhibited write clock results in discarding every fourth pixel in the odd and even fields of a frame, over a four frame cycle, such that pixels are discarded along orthogonally related diagonals in successive frames.

10. The method of claim 7 wherein said compressing step comprises:

writing all of said luma samples and said corresponding ones of said chroma samples into separate one horizontal line memories with a write clock; and reading said luma samples and said corresponding ones of said chroma samples from said separate one horizontal line memories with a read clock that is one third faster than said write clock.

11. A television receiver for processing a color video signal formatted with an aspect ratio L1×H1 for display on a surface having a larger aspect ratio L2×H2, with the H1, H2 dimension being normalized, comprising:

means for digitizing said color video signal into luma samples and chroma sample, there being a greater number of said luma samples than said chroma samples in said color video signal;

aspect ratio conversion means, for developing from said luma samples and said chroma samples a converted color signal compressed by a factor L1H2/L2H1, including means for developing a second digitized color video signal having an equal number of said chroma samples and said luma samples and memory means, having a pair of one line memories for said luma samples and corresponding ones of said chroma samples, for processing said second digitized color video signal to develop said converted color video signal; and means for displaying said converted color signal.

12. The receiver of claim 11 wherein said memory means includes an inhibited write clock for writing a proportionate number of said luma samples and said corresponding ones of said chroma samples into memory and an uninhibited read clock of the same frequency for reading samples from said memory.

13. The receiver of claim 11 wherein said memory means includes a write clock for writing said luma samples and said corresponding ones of said chroma samples into memory, and a read clock that is proportionately faster than said write clock for reading said samples from said memory.

14. A television receiver for processing a color video signal formatted with a 4×3 aspect ratio for display on a surface having a 16×9 aspect ratio comprising:

means for digitizing said color video signal into luma samples and chroma samples, there being a greater number of said luma samples than said chroma samples;

aspect ratio conversion means for developing from said luma samples and said chroma samples, a converted color signal compressed by twenty-five percent, said aspect ratio conversion means including means for developing a corresponding one of said chroma samples for each said luma sample, and memory means, having a pair of one line memories for said luma samples and said corresponding ones of said chroma samples and means for developing write and read signals for writing samples to said one line memories and reading samples from said one line memories for developing said converted color video signal; and means for displaying said converted color signal.

15. The receiver of claim 14 wherein said developing means develops interpolated chroma samples by averaging each said chroma sample with a group of preceding ones of said chroma samples.

16. The receiver of claim 15 wherein said write signal is inhibited to discard one of four samples during writing of said samples to said one line memories.

17. The receiver of claim 15 wherein said read signal reads said samples from said one line memories one third faster than said samples are written to said one line memories.

18. The receiver of claim 15 further including; means for reducing the ratio of said interpolated chroma samples to said luma samples prior to writing said samples to said memory means.

19. The receiver of claim 18 wherein said reducing means includes a latch means and multiplex means.

* * * * *